INVENTORS
EDWARD JURKEN
PAUL J. POULAKOS

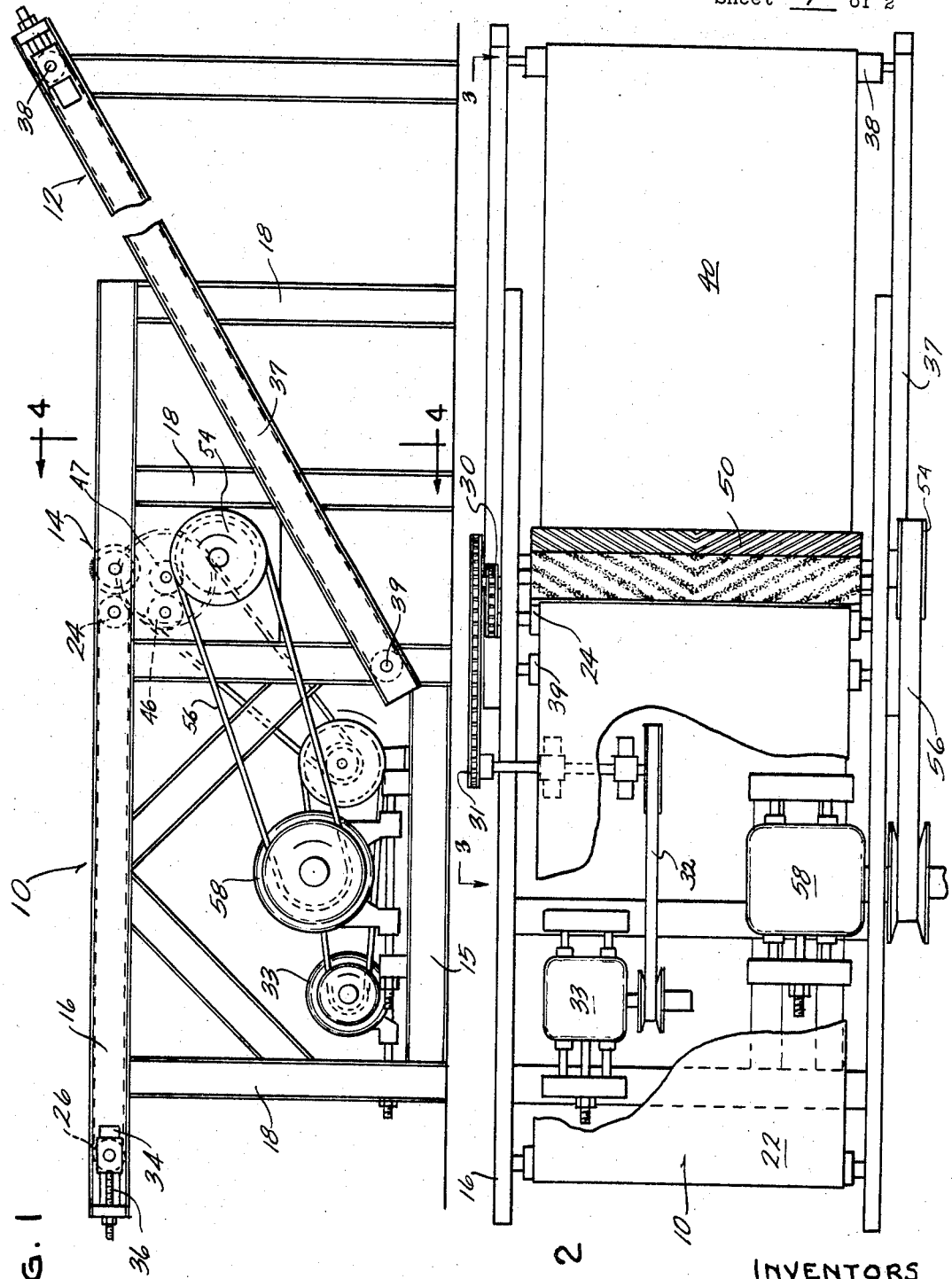

ATTORNEY

United States Patent Office 3,423,967
Patented Jan. 28, 1969

3,423,967
SUPPLING MACHINE
Edward Jurken, 4807 W. Woodlawn Court, Milwaukee, Wis. 53208, and Paul J. Poulakos, 2609 W. Mangold Ave., Milwaukee, Wis. 53221
Filed Mar. 23, 1966, Ser. No. 536,775
U.S. Cl. 69—33          6 Claims
Int. Cl. C14b 1/40

ABSTRACT OF THE DISCLOSURE

A feed-through suppling machine in which pieces of hide are conveyed by a flat conveyor to two holding rolls which grip the hide at the drop-off end of the conveyor and feed the hide into the nip of a suppling roll which is provided with helically arranged knives which are in engagement with a resiliently covered backup roll. The holding rolls rotate in the peripheral direction of travel of the hide but at a smaller peripheral speed than the hide. A spreader brush is provided at the drop-off end of the conveyor.

---

This invention pertains to improvements in suppling machines which are used in the leather making industry to subject a hide or skin to a stretching and softening treatment. More specifically, this invention pertains to a through-feed type of suppling machine in which the hide to be treated enters the machine and its staking tools at one side of the machine and leaves the machine in a properly treated condition at the other end; with the principal point of novelty being the simplicity of construction and operation of the machine.

The inventive concept of the present invention is to provide two pairs of horizontally spaced rolls, a pair of holding rolls positioned above a pair of staking rolls, at the drop-off end of a generally flat belt conveyor. The hide pieces to be suppled are merely thrown in a somewhat spread out manner on the conveyor which conveys the hide past a rotating spreading brush and guides them into the upwardly open nip formed by the holding rolls which rotate in a direction to feed the hide downwardly into an upwardly open nip formed by the suppling rolls. The suppling rolls also rotate in a direction to feed the hide downwardly, however they rotate at a faster speed than the holding rolls and thus provide the necessary stretching in the longitudinal direction. One of the suppling rolls is merely a rubber covered idler which is adapted to engage the skin side of the hide and rotates by virtue of being biased against the driven suppling roll. The driven suppling roll is provided with helically arranged knife edges which scrape the flesh side of the hide and, by virtue of the helical arrangement, stretch and scrape the hide in the transverse direction. After the hide passes through these rolls, it drops on a second conveyor which deposits the treated piece in a bin or other convenient storage space.

From the above it should be appreciated that the only manual labor involved in the operation of a suppling machine as described above is the dropping of the hides on the traveling top conveyor and that the rest of the work is performed automatically. In view of this, the speed of operation of the suppling machine is greatly increased over previously used similar machines in which the operator had to continually guide the workpiece into the suppling or holding rolls. From a commercial point of view, the simplicity of operation and speed of the present machine has permitted the replacement of these skilled workers by one unskilled worker.

In view of the above the principal object of the present invention is to provide a more efficient yet a more simple suppling machine than has been known heretofore.

Other objects and advantages will be pointed out in, or be apparent from, the specification and claims, as will obvious modifications of the single embodiment shown in the drawings, in which.

FIG. 1 is a side view of the suppling machine embodying the present invention;

FIG. 2 is a top view thereof with portions of the top conveyor being broken away to disclose driving motors of this machine;

Figure 3:
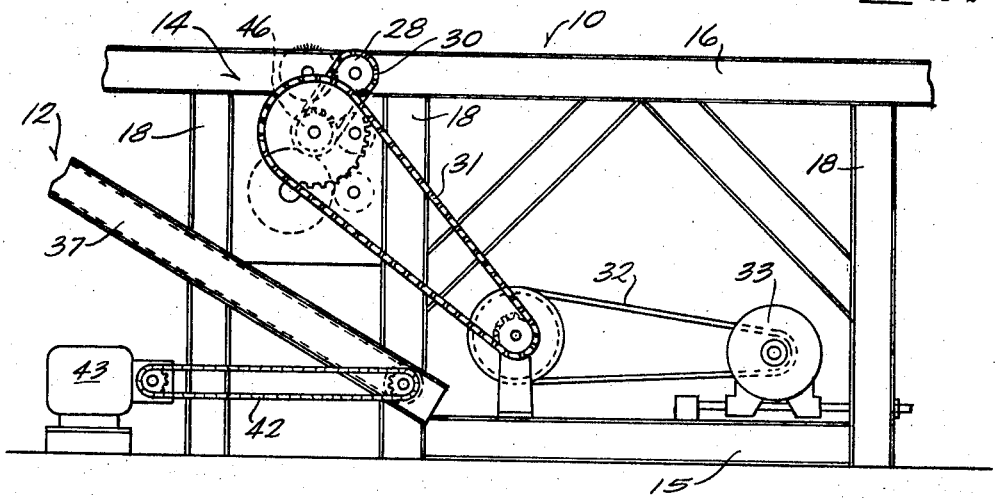
FIG. 3 is a fragmentary side view on line 3—3 of FIG. 2.

Referring to the drawings, the suppling machine embodying the present invention is essentially comprised of two conveyors, a generally horizontally disposed top conveyor 10 and an upwardly inclined bottom conveyor 12, and suppling apparatus 14 positioned at the drop-off end of the top conveyor.

The top conveyor 10 has a conveyor frame 16 which is positioned about waist high above the base 15 of the machine by suitable frame members 18. The conveyor belt 22 is a flat fabric belt which travels over a driven belt roller 24 and an idler belt roller 26. The roller 24 is journaled in the conveyor frame and is provided with a sprocket 28 (FIG. 3) which is connected through chains 30 and 31 and through belt 32 to an electric motor 33. The idler roller is rotatably supported at its ends in elongated slots 34 provided in the conveyor frame and may be moved in the fore aft directions by an appropriate adjustment bolt 36 to thereby tighten or loosen the belt as necessary.

The bottom conveyor 12 is identical to the top conveyor, having an identical frame 37, idler and driving rollers 38 and 39, and a fabric belt 40. The driving roller 39 is provided with a sprocket 41 which is connected by a chain 42 to an electric motor 43. Both conveyors travel from left to right where viewed in FIG. 1.

Figure 4:
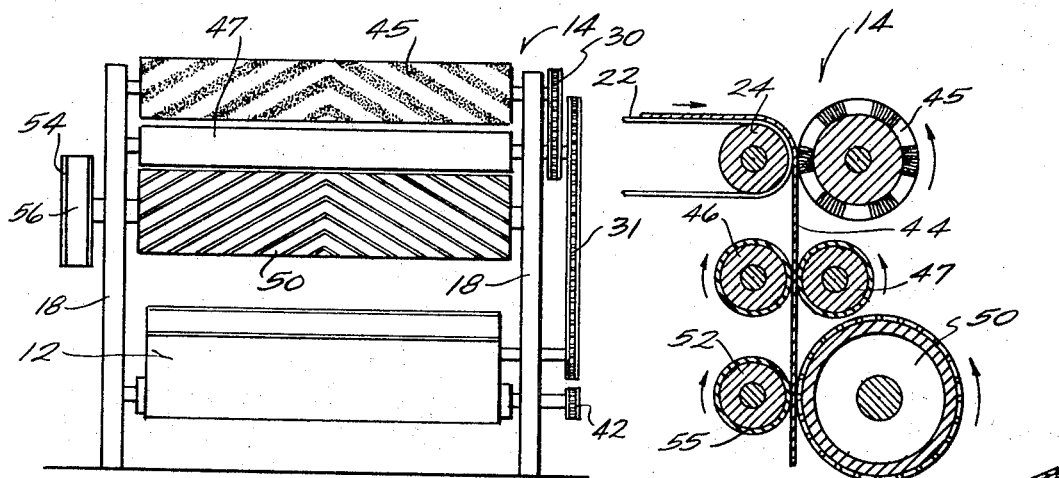
FIG. 4 is an end view taken on line 4—4 of FIG. 1.
Figure 5:
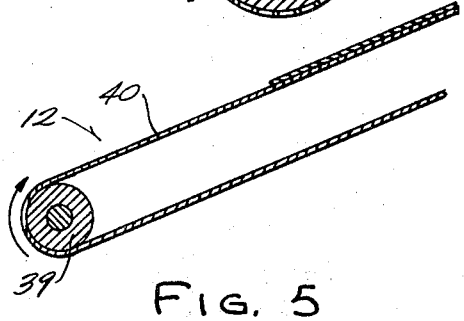
FIG. 5 is an enlarged cross-sectional view showing the arrangement of the conveyors and staking apparatus of this machine with the direction of rotation and travel being indicated by appropriate arrows.

As best seen in FIG. 5, the two conveyors are so arranged that a piece of hide 44 which has been layed on the top conveyor belt 22 will drop into the suppling apparatus 14 and, after passing therethrough, will drop onto the conveyor belt 40 of the bottom conveyor. As the hide 44 reaches the drop-off end of the conveyor it will be engaged by the flexible bristles of a spreader brush 45 which is in sufficient contact with the conveyor belt 22 to be rotated thereby. As best seen in FIG. 4, the bristles of the spreader brush are arranged in a herring bone pattern, and because of this, will tend to smoothen out any wrinkles that are present in the hide as it reaches the drop-off end of the conveyor. If desired, the brush could be powered, however the frictional engagement between the brushes and the hide has proven to be sufficient to smooth out the wrinkles which can be expected if the hide is dropped in a generally flat or spread out postiion on the conveyor belt 22. The rotating herring bone brush has been found to be preferable over stationary spreaders known heretofore, since it smooths out even quite minute wrinkles whereas the stationary spreaders often tended to press minute wrinkles into tiny folds.

As the front portion of the hide leaves the spreader brush it is fed into the top open nip formed between the two resilient holding rolls 46 and 47 which rotate in opposite directions, as shown by the arrows in FIG. 5. Roll 46 is provided with a sprocket 48 and is connected through chain 31 and a belt 32 to the electric motor 33. Both holding rolls are rubber covered and roll 47 is biased against roll 46 and thus is frictionally rotated thereby.

After the front portion of the hide passes through the holding roll it enters into the top-open nip formed between the suppling rolls 50 and 52. The roll 50 is provided with a pulley 54 and is connected through a belt 56 to an electric motor 58. Its peripheral face is provided with knife edge scraping tools which are arranged in a herring bone fashion to thus provide some scraping in the transverse as well as longitudinal direction on the flesh side of the hide.

Figure 6:
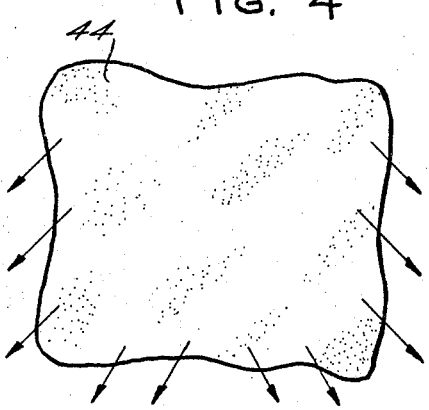
FIG. 6 is a top view of a piece of hide illustrating the direction of the forces to which it is subjected to as it passes through the suppling rolls.

The roll 52 is a back-up roll and is provided with a resilient rubber cover 55. It is biased against the surface of the roll 50 and is thus frictionally rotated thereby. Roll 50 is rotated at a faster peripheral speed than the holding rolls. As the hide 44 enters the nip between the suppling rolls both rotate at a faster peripheral speed than the downward movement of the hide. However, as soon as the hide is gripped by these rolls, the back-up roll 52 will rotate at a peripheral speed equal to the hide movement whereas the knife carrying blade will maintain its faster speed. Because of this, the flesh side of the hide will be scraped and stretched by the scraping tools in an outward and downward direction, as shown by the arrows in FIG. 6, however the skin side will not be subjected to a scraping or rubbing action. After the hide passes through the suppling rolls it drops on the conveyor 12 and is conveyed to a suitable storage place.

Although but a single embodiment of the present invention has been illustrated and described, it will be apparent to those skilled in the art that various changes and modifications may be made therein without departing from the spirit of the invention or from the scope of the appended claims.

We claim:
1. A suppling machine comprising:
   a conveyor having a generally flat traveling conveyor belt operable to convey pieces of hide from one end of the conveyor to a drop-off end thereof;
   a pair of holding rolls in top-open nip forming relationship positioned at said drop-off end below the conveyor so as to permit the leading end of the hide conveyed by said conveyor to pass into their top-open nip;
   a pair of suppling rolls in top-open nip forming relationship positioned below said holding rolls so as to permit the leading end of the hide to pass into their top-open nip after it has passed through said holding rolls;
   the first of said suppling rolls having staking knives positioned around its outer periphery in a herring bone pattern and the second of said suppling rolls having a surface which is biased towards said first suppling roll to permit said two suppling rolls to resiliently engage the leading end of the hide as it is passed from said two holding rolls into said top-open nip suppling rolls and to pull said hide past said suppling rolls upon further rotation of said suppling rolls;
   said pair of holding rolls and said pair of suppling rolls being fixedly mounted with the nip of said suppling rolls being in substantial vertical alignment below the nip of said holding rolls; and
   motor means to rotate said holding rolls and said suppling rolls in a downwardly peripheral direction with said one of said suppling rolls rotating at a faster peripheral speed than said holding rolls to thereby stretch and scrape the hide in the longitudinal and transverse directions.

2. A suppling machine according to claim 1 including a smoothing roll having resilient bristles positioned around its outer periphery in a herring bone pattern, said smoothing roll being rotatably mounted at the drop-off end of said conveyor in a position to engage the hide conveyed by the conveyor as it leaves the same and to thereby cause said bristles to smooth wrinkles of the hide as it passes off the conveyor and into the nip formed by said holding rolls.

3. A suppling machine according to claim 2 wherein said smoothing roll is freely rotatably mounted at the drop-off end of said conveyor, and wherein it is rotated by the frictional force created by virtue of its engagement with the hide conveyed by said conveyor.

4. A suppling machine according to claim 1 wherein said bias between said two suppling rolls is provided by a resilient cover of said second suppling roll which cover is engaged with said knives of said first suppling roll when no work is therebetween.

5. A suppling machine according to claim 4 wherein said first suppling roll is rotated by said motor means and wherein said second suppling roll is rotated by virtue of its resilient cover being in engagement with said first suppling roll prior to the engagement of the hide and by virtue of being in resilient engagement with the hide as it is moved past said suppling rolls.

6. A suppling machine according to claim 5 wherein each of said holding rolls are provided with a resilient cover and wherein one of said holding rolls is connected to said motor means to be driven thereby and said other of said holding rolls is biased against said one holding roll and is rotated by virtue of the frictional engagement between said rolls.

References Cited

UNITED STATES PATENTS

| | | | |
|---|---|---|---|
| 675,732 | 6/1901 | Henry | 69—34 |
| 1,496,025 | 6/1924 | Ruhe | 69—42 |
| 1,562,418 | 11/1925 | Tenney | 69—42 |
| 2,201,461 | 5/1940 | Wayland | 69—34 |
| 2,596,125 | 5/1952 | Campbell | 69—34 |
| 2,956,427 | 10/1960 | Blatz | 69—33 |
| 3,085,421 | 4/1963 | Bucek | 69—42 |

FOREIGN PATENTS 460,491  11/1950  Italy.

PATRICK D. LAWSON, *Primary Examiner.*

A. R. GUEST, *Assistant Examiner.*

UNITED STATES PATENT OFFICE
CERTIFICATE OF CORRECTION

Patent No. 3,423,967                                                  January 28, 1969

Edward Jurken et al.

It is certified that error appears in the above identified patent and that said Letters Patent are hereby corrected as shown below:

Column 3, line 59, after "nip" insert -- of said --.

Signed and sealed this 31st day of March 1970.

(SEAL)
Attest:

Edward M. Fletcher, Jr.                           WILLIAM E. SCHUYLER, JR.
Attesting Officer                                           Commissioner of Patents